(12) United States Patent
Gammon

(10) Patent No.: US 8,091,575 B2
(45) Date of Patent: Jan. 10, 2012

(54) VALVE SYSTEM

(75) Inventor: James H. Gammon, Manasquan, NJ (US)

(73) Assignee: Gammon Technical Products, Inc., Manasquan, NJ (US)

( * ) Notice: Subject to any disclaimer, the term of this patent is extended or adjusted under 35 U.S.C. 154(b) by 883 days.

(21) Appl. No.: 12/109,694

(22) Filed: Apr. 25, 2008

(65) Prior Publication Data

US 2008/0277000 A1 Nov. 13, 2008

Related U.S. Application Data

(60) Provisional application No. 60/917,157, filed on May 10, 2007.

(51) Int. Cl.
*G05D 11/13* (2006.01)

(52) U.S. Cl. ..................... 137/88; 137/100; 137/101.19; 137/101.21; 137/115.03; 137/115.04

(58) Field of Classification Search ............ 137/88, 137/98, 100, 101.19, 101.21, 114, 115.01, 137/115.03, 115.04, 118.04, 599.05, 599.06, 137/599.07, 2, 9

See application file for complete search history.

(56) References Cited

U.S. PATENT DOCUMENTS

| 3,506,460 A * | 4/1970 | Bayne ........................... 426/320 |
| 3,830,256 A | 8/1974 | Cox |
| 4,007,755 A * | 2/1977 | Lerner et al. ............. 137/101.21 |
| 4,112,515 A | 9/1978 | Sandow |
| 4,320,775 A | 3/1982 | Stirling et al. |
| 4,337,786 A | 7/1982 | Myers et al. |
| 4,341,107 A | 7/1982 | Blair et al. |
| 5,329,965 A * | 7/1994 | Gordon .................... 137/599.07 |
| 5,455,076 A | 10/1995 | Lee et al. |
| 6,273,120 B1 * | 8/2001 | Hofmann et al. ............... 137/98 |
| 2004/0136832 A1 | 7/2004 | Hammonds |

* cited by examiner

*Primary Examiner* — John Rivell
*Assistant Examiner* — Kevin Murphy
(74) *Attorney, Agent, or Firm* — Fraser Clemens Martin & Miller LLC; J. Douglas Miller

(57) ABSTRACT

A valve system for monitoring and controlling a flow of a fluid additive into a main fluid line is disclosed. The system includes a pump that provides a constant flow of the additive from a fluid reservoir through a supply conduit into the main fluid line. A portion of the fluid additive may be diverted into one or more return conduits leading back to the reservoir by opening a solenoid actuated valve in the return conduit. Flow meters are employed to detect the flow rates of the fluids in the supply conduit and the main fluid line. The flow meters provide signals to a control system, which are effective to control the operation of the solenoid actuated valves to maintain a desired flow of the additive into the main fluid line.

13 Claims, 1 Drawing Sheet

VALVE SYSTEM

CROSS-REFERENCE TO RELATED APPLICATION

This application claims the benefit of U.S. Provisional Patent Application Ser. No. 60/917,157 filed on May 10, 2007.

FIELD OF THE INVENTION

The invention relates to a valve system, and more specifically to a valve system for monitoring and controlling the flow of a fluid additive into a main fluid line.

BACKGROUND OF THE INVENTION

It is often necessary to provide a fluid additive to a primary fluid in a main fluid line. Additionally, the ratio of the fluid additive to the primary fluid must be maintained at a desired level. The flow rate of the fluid additive must be adjusted as the flow rate of the primary fluid changes to maintain the desired ratio of the mixed fluids.

A system currently used to control the flow rate of the fluid additive employs a conduit providing fluid communication between a reservoir for the fluid additive and the main fluid line. A pump is provided to introduce the fluid additive from the reservoir through the conduit and into the main fluid line. A solenoid actuated valve is disposed to alternately allow or prevent the flow of the fluid additive through the conduit into the main fluid line. The system provides an uneven supply of the fluid additive to the main fluid line. When averaged over a time interval, the desired flow rate of the fluid additive into the main fluid may be obtained. However, at any given point in time, the flow rate of the fluid additive into the main line is either greater than or less than the required flow rate.

It would be desirable to have a valve system providing a substantially continuous and proportional flow of a fluid additive into a main fluid line wherein the valve system detects a flow rate of a primary fluid in the main fluid line and adjusts the flow rate of the fluid additive to maintain a desired ratio of the fluid additive to the primary fluid in the main fluid line.

SUMMARY OF THE INVENTION

Compatible and attuned with the present invention a valve system providing a substantially continuous and proportional flow of a fluid additive into a main fluid line wherein the valve system detects a flow rate of a primary fluid in the main fluid line and adjusts the flow rate of the fluid additive to maintain a desired ratio of the fluid additive to the primary fluid in the main line has surprisingly been discovered.

The above objective as well as others, may be achieved by a valve system for monitoring and controlling a flow of a fluid additive into a main fluid line comprising a fluid reservoir adapted to contain the fluid additive; a supply conduit providing fluid communication between the reservoir and the main fluid line; a pump adapted to cause a flow of the fluid additive from the reservoir through the supply conduit; first means to selectively prevent the flow of the fluid additive into the main fluid line; at least one return conduit providing fluid communication from the supply conduit to the reservoir, the return conduit including an orifice restriction; second means to selectively prevent the flow of fluid additive through the return conduit; a first flow meter disposed in the supply conduit adapted to detect a flow rate of the fluid additive into the main fluid line; a second flow meter disposed in the main fluid line adapted to detect a fluid flow rate within the main fluid line; and means for controlling the pump, the first means, and the second means, wherein a signal from the first flow meter and a signal from the second flow meter are effective to control the operation of the pump, the first means, and the second means to maintain a desired flow of the fluid additive into the main fluid line.

The above objective as well as others, may also be achieved by a valve system for monitoring and controlling a flow of a fluid additive into a main fluid line comprising a fluid reservoir adapted to contain the fluid additive; a supply conduit providing fluid communication between the reservoir and the main fluid line; a pump adapted to cause a flow of the fluid additive from the reservoir through the supply conduit; a solenoid actuated valve to selectively prevent the flow of the fluid additive into the main fluid line; a first return conduit providing fluid communication from the supply conduit to the reservoir, the return conduit including an orifice restriction, and a solenoid actuated valve to selectively prevent the flow of the fluid additive through the first return conduit; a second return conduit providing fluid communication from the supply conduit to the reservoir, the return conduit including an orifice restriction, and a solenoid actuated valve to selectively prevent the flow of the fluid additive through the first return conduit; a first flow meter disposed in the supply conduit adapted to detect a flow rate of the fluid additive into the main fluid line; a second flow meter disposed in the main fluid line downstream form the supply conduit adapted to detect a fluid flow rate within the main fluid line; and a programmable logic controller for controlling the pump and the solenoid actuated valves, wherein a signal from the first flow meter and a signal from the second flow meter are employed to control the operation of the pump and the solenoid actuated valves to maintain a desired flow of the fluid additive into the main fluid line.

The above objective may also be achieved by a method of monitoring and controlling a flow of a fluid additive into a main fluid line comprising the steps of providing a source of the fluid additive in fluid communication with the main fluid line; causing the fluid additive to flow from the source into the main fluid line; monitoring the flow rate of the fluid additive into the main fluid conduit; monitoring the flow rate of a fluid in the main fluid line; and diverting a selected amount of the fluid additive into a return line in fluid communication with the source of the fluid additive to maintain a desired flow rate of the fluid additive into the main fluid line.

BRIEF DESCRIPTION OF THE DRAWINGS

The above, as well as other objects and advantages of the invention, will become readily apparent to those skilled in the art from the following detailed description of an embodiment of the invention when considered in the light of the accompanying drawing, in which.

DETAILED DESCRIPTION OF A PREFERRED EMBODIMENT OF THE INVENTION

Figure 1:
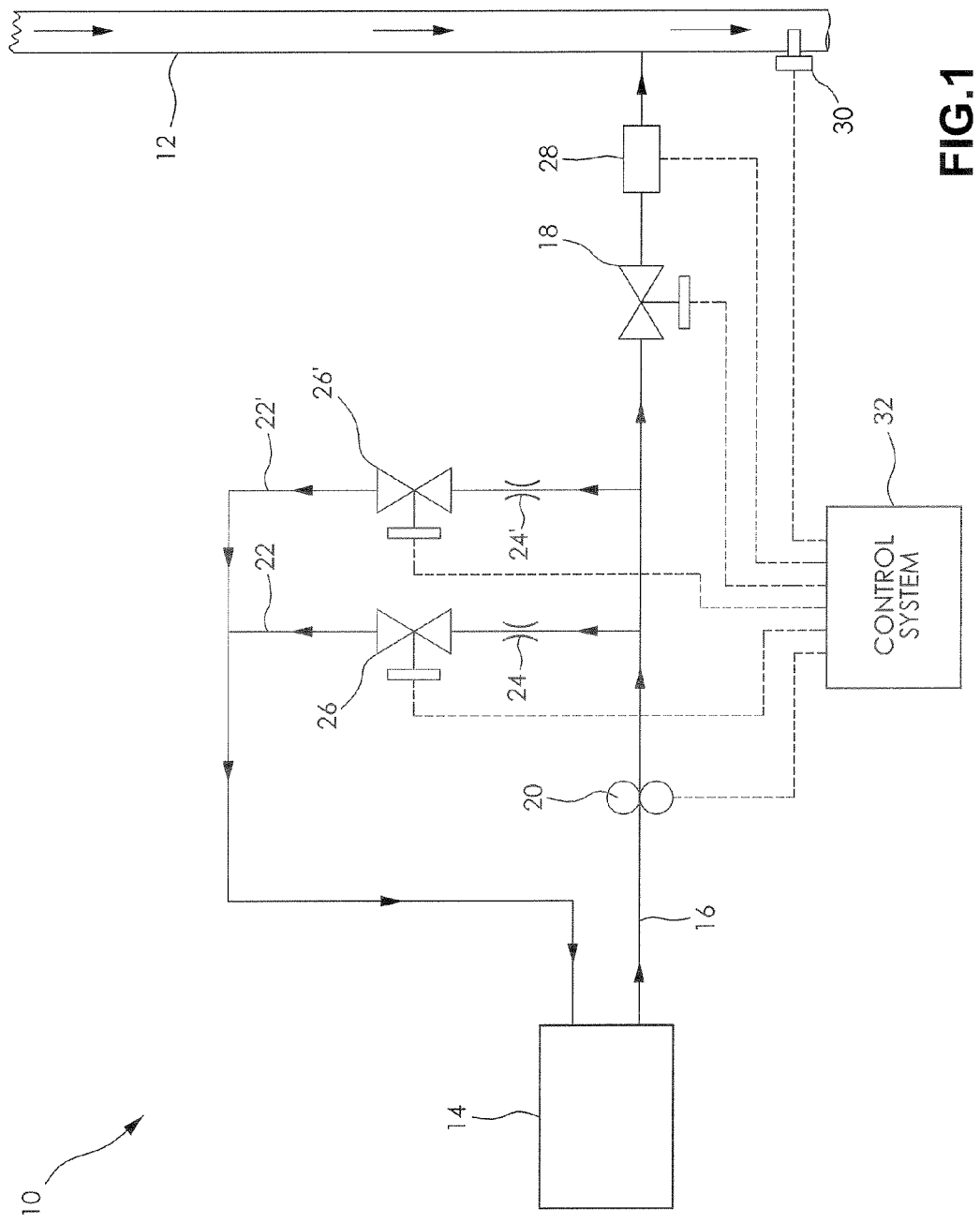
FIG. 1 is a schematic illustration of a valve system for monitoring and controlling a flow of a fluid additive into a main fluid line according to an embodiment of the invention.

The following detailed description and appended drawing describe and illustrate an exemplary embodiment of the invention. The description and drawing serve to enable one skilled in the art to make and use the invention, and are not intended to limit the scope of the invention in any manner. In respect of the methods disclosed, the steps presented are exemplary in nature, and the order of the steps is not regarded as necessary or critical.

Referring to FIG. 1, there is illustrated a schematic of a valve system, generally indicated by reference numeral 10. The system 10 is adapted to monitor and control the flow of a fluid additive into a main fluid line 12 containing a transient primary fluid. The system 10 includes a fluid reservoir 14 adapted to contain the fluid additive. A supply conduit 16 provides fluid communication between the reservoir 14 and the main fluid line 12. The supply conduit 16 includes a normally opened solenoid actuated valve 18 adapted to selectively prevent fluid communication between the reservoir 14 and the main fluid line 12. A pump 20 is provided to cause the fluid additive to flow from the reservoir 14 through the supply conduit 16 and into the main fluid line 12.

Return conduits 22, 22' are in fluid communication with the supply conduit 16 and the reservoir 14. It should be understood that any number of return conduits may be used as desired. The return conduits 22, 22' include orifice restrictions 24, 24' and solenoid actuated valves 26, 26', respectively. The orifice restrictions 24, 24' facilitate a desired flow of the additive fluid through the respective return conduits 20, 20'. It should be understood that the orifice restrictions 24, 24' can be similar to each other to facilitate substantially equivalent flow rates through the respective return conduits 22, 22' or different from each other to facilitate substantially different flow rates through the respective return conduits 22, 22'. The solenoid actuated valves 24, 24' are normally closed and adapted to selectively open the fluid communication through the return conduits 22, 22'.

A first flow meter 28 is disposed in the supply conduit 16 adjacent the main fluid line 12 to detect a flow rate of the additive fluid into the main fluid line 12. A second flow meter 30 is disposed in the main fluid line 12 downstream from the supply conduit 16. The second flow meter 30 is adapted to detect a flow rate of the combined fluid additive and primary fluid in the main fluid line 12. It should be understood the second flow meter 30 can be disposed in the main fluid line 12 upstream from the supply conduit 16 to detect the flow rate of the primary fluid only.

The system 10 includes a control system 32 in electrical communication with the pump 20, the return conduit solenoid actuated valves 26, 26', the supply conduit solenoid actuated valve 18, the first flow meter 28, and the second flow meter 30. The control system 32 is adapted to receive an electrical signal from the flow meters 28, 30 and send electrical signals to the pump 20 and solenoid actuated valves 18, 26, 26'. It should be understood that the control system 32 can include means for a user to input at least one operational parameter for the system 10. For example, the desired flow rate of the additive through the supply conduit 16, or a desired ratio of the fluid additive to the primary fluid in the main fluid line 12 can be input to the control system 32. In the preferred embodiment, the control system 32 includes a programmable logic controller (PLC) and at least one relay adapted to receive and send the selected electrical signals. Additionally, it should be understood that the control system 32 can be adapted to cause the flow of the primary fluid in the main fluid line 12 to be stopped when the flow meter 28 detects that the additive is not flowing into the main fluid line 12 such as in the event when the fluid reservoir 14 is empty, for example.

In operation, the control system 32 energizes the pump 20 causing a constant flow of fluid additive from the reservoir 14 toward the main fluid line 12. The first flow meter 28 and the second flow meter 30 detect the flow rates of the fluid additive in the supply conduit 16 and the primary fluid in the main fluid line 12, respectively. The flow meters 28, 30 provide a representative electrical signal of the respective flow rates to the control system 32. The electrical signals from the flow meters 28, 30 are employed by the control system 32 to determine the ratio of the fluid additive to the primary fluid in the main fluid line 12. The control system 32 then compares the ratio to a pre-set desired ratio. If the ratio does not match the desired ratio, the control system 32 sends appropriate electrical signals to the solenoid actuated valves 18, 26, 26' to adjust the flow rate of the fluid additive entering the main fluid line 12 and maintain the desired ratio therein. In particular, the control system 32 is operative to close the solenoid actuated vale 18 in the supply conduit 16 during a shut down of the system 10 and the cessation of primary fluid flow in the main fluid line 12 preventing fluid additive from entering the main fluid line 12. Alternatively, the control system 32 is operative to open solenoid actuated valve 26 causing a portion of the fluid additive to be diverted from the supply conduit 16 into the return conduit 22 and back into the reservoir 14. The orifice restriction 24 controls the amount of fluid additive diverted through the return conduit 22. By diverting a portion of fluid additive to the return conduit 22, the flow of fluid additive into the main line 12 is reduced. It should be understood that the control system 32 is operative to open the solenoid valve 26 only; or open the solenoid valve 26' only; or open both of the solenoid valves 26, 26' providing three possible flow rates of the fluid additive into the main line 12.

The control system 32 is operative to open and close the solenoid valves 26, 26' in any combination or sequence, and for any length of time necessary to achieve the desired ratio between the fluid additive and the primary fluid in the main fluid line 12. The flow of the fluid additive into the main fluid line 12 is not prevented as long as the primary fluid is flowing through the main fluid line 12. The flow rate of the fluid additive is increased or decreased to maintain the desired ratio, which maintains an uninterrupted flow of the fluid additive into the main line 12. The uninterrupted flow optimizes the consistent mixing of the fluid additive with the primary fluid in the main fluid line 12 at the desired ratio. The unique valve system 10 provides an economical means of monitoring and controlling the flow of the fluid additive into the main fluid line.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A valve system for monitoring and controlling a flow of a fluid additive into a main fluid line comprising:
    a fluid reservoir adapted to contain the fluid additive;
    a supply conduit providing fluid communication between the reservoir and the main fluid line;
    a pump adapted to cause a continuous and uninterrupted flow of the fluid additive from the reservoir through the supply conduit to the main fluid line;
    a first valve to selectively prevent the flow of the fluid additive into the main fluid line, the first valve disposed along the supply conduit and being normally opened;
    at least one return conduit providing fluid communication from the supply conduit to the reservoir, the return conduit including an orifice restriction;
    a second valve to selectively prevent the flow of fluid additive through the return conduit, the second valve disposed along the return conduit and being normally closed, the orifice restriction disposed between the supply conduit and the second valve;

a first flow meter disposed in the supply conduit adapted to detect a flow rate of the fluid additive into the main fluid line;

a second flow meter disposed in the main fluid line adapted to detect a fluid flow rate within the main fluid line; and means for controlling the pump, the first valve, and the second valve, wherein a signal from the first flow meter and a signal from the second flow meter are effective to control the operation of the pump, the first valve, and the second valve to maintain a desired flow of the fluid additive into the main fluid line.

2. The valve system according to claim 1, wherein the first valve is a solenoid actuated valve.

3. The valve system according to claim 1, including a pair of return providing fluid communication from the supply conduit to the reservoir, each of the return conduits including an orifice restriction.

4. The valve system according to claim 1, wherein the second valve is a solenoid actuated valve.

5. The valve system according to claim 1, wherein the second flow meter is disposed in the main fluid line downstream from the supply conduit.

6. The valve system according to claim 1, wherein the second flow meter is disposed in the main fluid line upstream from the supply conduit.

7. The valve system according to claim 1, wherein the means for controlling includes means to input at least one operating parameter for the valve system.

8. The valve system according to claim 7, wherein the operating parameter includes at least one of the desired additive flow rate and a desired ratio of the fluid additive to the primary fluid in the main fluid line.

9. The valve system according to claim 1, wherein the means for controlling includes a programmable logic controller.

10. The valve system according to claim 9, wherein the means for controlling includes at least one relay.

11. A valve system for monitoring and controlling a flow of a fluid additive into a main fluid line comprising:

a fluid reservoir adapted to contain the fluid additive;

a supply conduit providing fluid communication between the reservoir and the main fluid line;

a pump adapted to cause a continuous and uninterrupted flow of the fluid additive from the reservoir through the supply conduit to the main fluid line;

a first solenoid actuated valve to selectively prevent the flow of the fluid additive into the main fluid line, the first solenoid actuated valve being normally open;

a first return conduit providing fluid communication from the supply conduit to the reservoir, the return conduit including a first orifice restriction, and a second solenoid actuated valve to selectively prevent the flow of the fluid additive through the first return conduit, the second solenoid actuated valve being normally closed, the first orifice restriction disposed between the supply conduit and the second solenoid actuated valve;

a second return conduit providing fluid communication from the supply conduit to the reservoir, the return conduit including a second orifice restriction, and a third solenoid actuated valve to selectively prevent the flow of the fluid additive through the second return conduit, the third solenoid actuated valve being normally closed, the second orifice restriction disposed between the supply conduit and the third solenoid actuated valve;

a first flow meter disposed in the supply conduit adapted to detect a flow rate of the fluid additive into the main fluid line;

a second flow meter disposed in the main fluid line downstream form the supply conduit adapted to detect a fluid flow rate within the main fluid line; and a programmable logic controller for controlling the pump and the solenoid actuated valves, wherein a signal from the first flow meter and a signal from the second flow meter are employed to control the operation of the pump and the solenoid actuated valves to maintain a desired flow of the fluid additive into the main fluid line.

12. The valve system according to claim 11, wherein the program logic controller includes means to input at least one operating parameter for the valve system.

13. The valve system according to claim 12, wherein the operating parameter includes at least one of the desired additive flow rate and a desired ratio of the fluid additive to the primary fluid in the main fluid line.

* * * * *